A. BETTELEY.
Lattice Work for Iron Fences.
No. 20,400.
Patented June 1, 1858.
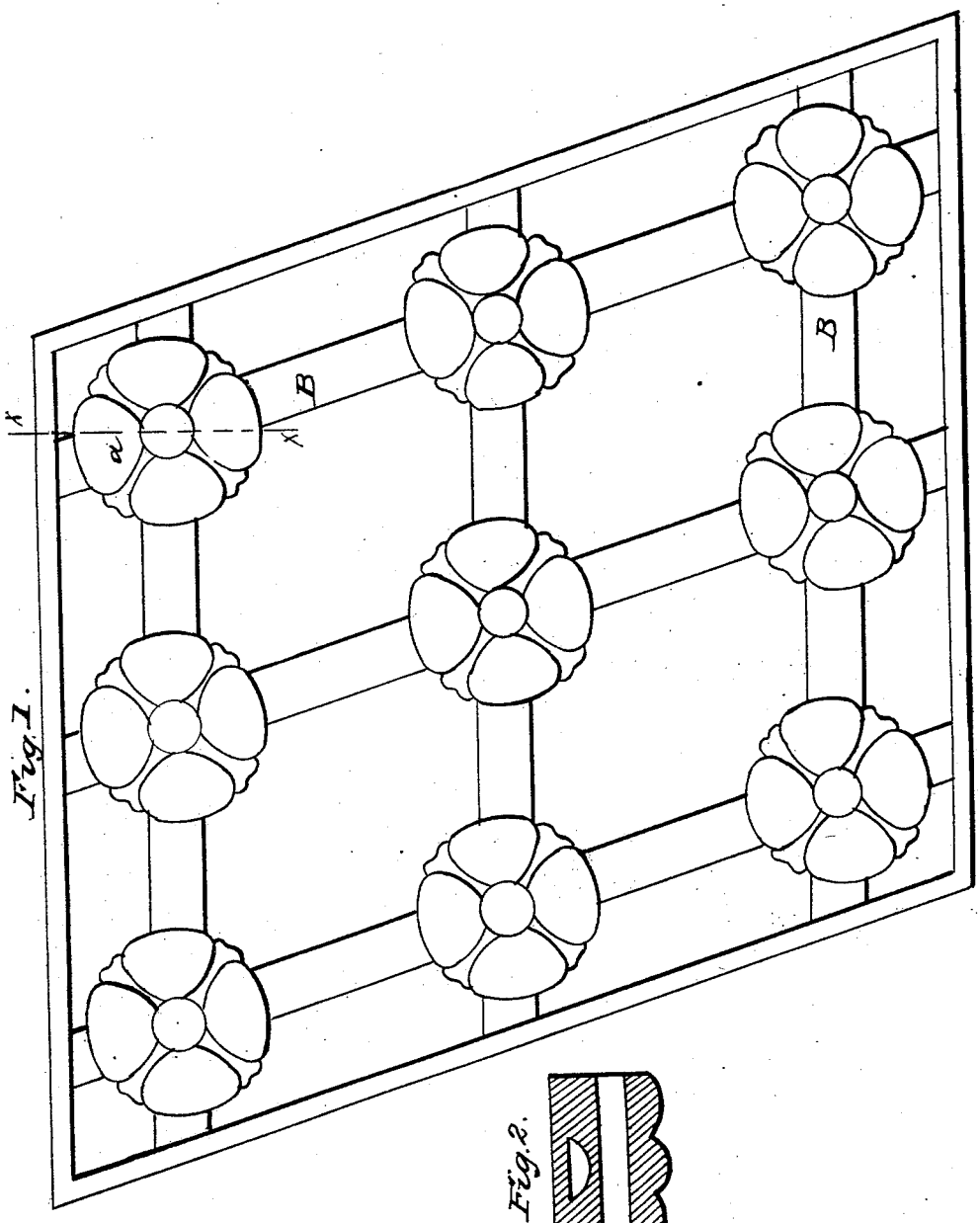

UNITED STATES PATENT OFFICE.

A. BETTELEY, OF BOSTON, MASSACHUSETTS.

LATTICE IRON FENCE.

Specification of Letters Patent No. 20,400, dated June 1, 1858.

*To all whom it may concern:*

Be it known that I, ALBERT BETTELEY, of the city of Boston, in the county of Suffolk and State of Massachusetts, have invented an Improvement in the Method of Constructing Lattice-Work for Iron Fences, Screens, and other Purposes; and I do hereby declare the following to be a clear, full, and exact description thereof, reference being had to the accompanying drawings, which form part of this specification, and to the letters of reference marked thereon.

The nature of my invention consists in forming tubes in bosses or hubs in different and parallel planes, but at any desired or convenient angle with each other in those planes, for the purpose of receiving the bars which form a lattice and tying them together. These bars when secured by a band around their ends, or to the posts, top and bottom rails of a fence, become practically immovable each upon the other and form, with the hubs and band, a lattice suitable for fence and for similar or ornamental uses.

To enable others skilled in the art to make and use my invention I will describe its construction.

Figure 1 is a view of a portion of a lattice constructed according to my improvement. Fig. 2 is a section of one of the bosses (A), on the line ($x$ $x$) seen in Fig. 1, showing the tubes formed therein for the reception of the bars (B). The bosses (A) may be made plain or highly ornamental and with two tubes formed therein, as shown by the drawings, or they may have any desired number of tubes, each in a different plane. These bosses may be made of any suitable material and the tubes formed in them in any convenient way. For fence work the bosses may be of cast iron with the tubes cored through them, and the bars may be wrought bars of any desired form of section.

Lattice work made in accordance with my invention is always neat in its appearance and may be made highly ornamental, it is strong and durable, and can be packed in small compass for transportation.

What I claim as my invention and desire to secure by Letters Patent, is—

Uniting the bars of a lattice, at their crossings, by suitable pieces having holes or tubes through them, at any desired angle with each other but in different and parallel planes, which embrace the bars substantially in the manner set forth.

ALBERT BETTELEY.

Witnesses:
J. B. CROSBY,
GORDON McKAY.